Figure 1:
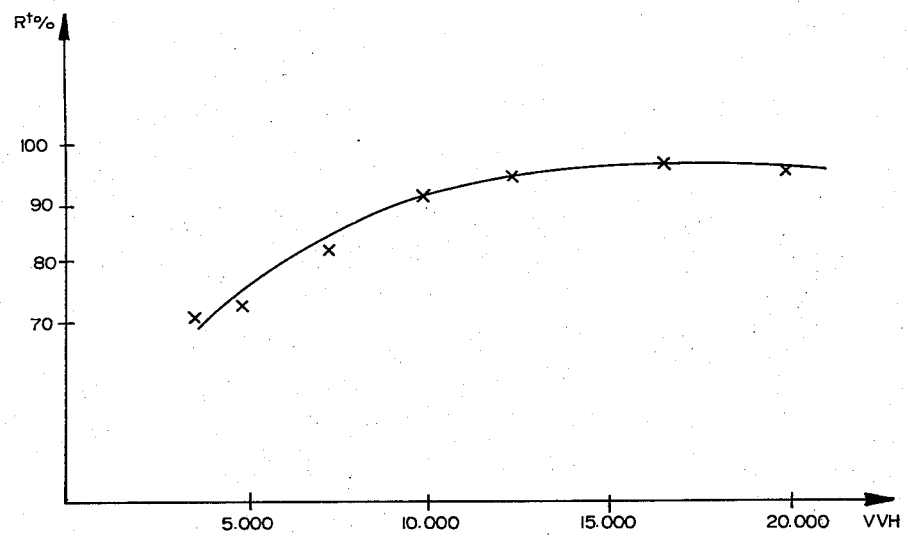

United States Patent [19]

Sénés et al.

[11] 3,907,975

[45] Sept. 23, 1975

[54] CATALYTIC OXIDATION OF AMMONIA

[75] Inventors: Michel Sénés, Saint Nazaire; Pierre Lhonoré, Douai; Michel Pottier, Saint Nazaire; Jacques Quibel, Maisons Laffitte, all of France

[73] Assignee: Societe Chimique de la Grande Paroisse et Produits Chimiques, Paris, France

[22] Filed: Apr. 11, 1973

[21] Appl. No.: 350,187

Related U.S. Application Data

[62] Division of Ser. No. 112,879, Feb. 5, 1971, abandoned.

[30] Foreign Application Priority Data

Feb. 9, 1970 France .............................. 70.04454

[52] U.S. Cl. .................. 423/404; 252/458; 252/473
[51] Int. Cl.² .......................................... C01B 21/26
[58] Field of Search ................... 423/392, 403, 404; 252/458, 465, 473

[56] References Cited

UNITED STATES PATENTS

| | | | |
|---|---|---|---|
| 1,322,291 | 11/1919 | Classen | 423/404 |
| 1,345,323 | 6/1920 | Frazer | 252/471 |
| 1,558,598 | 10/1925 | Ellis | 423/392 |
| 1,765,352 | 6/1930 | Jaeger | 423/404 |
| 1,919,216 | 7/1933 | Handforth et al. | 423/403 |
| 3,533,963 | 10/1970 | Senes et al. | 252/465 |
| 3,666,412 | 5/1972 | Sowards | 252/458 X |

*Primary Examiner*—G. O. Peters
*Attorney, Agent, or Firm*—Browdy and Neimark

[57] ABSTRACT

This invention relates to the catalytic oxidation of ammonia. The catalytic compounds are complex catalysts with limited porosities, with specific surface areas between 0.02 and 2 m²/g, containing an active material bonded by ceramic-type bonds to the elements of a refractory carrier made of refractory oxides such as magnesia, zirconia, silica.

Such compounds are suitable for the oxidation of ammonia over fixed beds or fluidized beds.

12 Claims, 4 Drawing Figures

CATALYTIC OXIDATION OF AMMONIA

This is a division of application Ser. No. 112,879, filed Feb. 5, 1971, now abandoned.

This invention relates to the catalytic oxidation of ammonia to nitrogen oxides, notably nitrogen monoxide, for the production of nitric acid. The nitric acid industry habitually uses a catalyst made of pure platinum, or of mixtures of pure metals of the platinum group, as gauzes with wire thicknesses between a few hundredths and a few tenths of a millimeter.

It is well known that in the low-temperature range, selectivity must intervene to favor the formation of NO and $NO_2$ rather than $N_2$, while in the high-temperature range, selectivity must intervene to favor the formation of NO rather than $N_2O$ and $N_2$.

When using the known catalytic technique, the difficulty is to vary the selectivity, owing to the use of a catalyst with a very low thickness (thickness of the gauzes). For instance, with a reactor of 3 m diameter working at low pressure, the total thickness of the gauzes varies between a fraction of a millimeter and a few millimeters.

Besides, metal gauzes catalysts start losing their activity in a comparatively short time. The replacement, repair and regeneration of conventional catalyst involve costly down-time.

It has also been suggested that a catalytic metal or alloy of metals of the platinum group be deposited as a thin, continuous or quasi-continuous layer upon the surface of the flow ducts and the surface macropores of a porous and inert refractory structure.

Depositing a thin layer does not avoid the disadvantages due to lack of selectivity.

On the other hand, the dispersion and the structure of the active material, the nature of the carrier and its intimate bonding with the said active material, the promoters and the porosity have been found to be important factors for catalysis. Such factors cannot be varied, nor introduced simultaneously into a metal or a catalytic metal alloy.

According to this invention, selective catalytic compounds have been discovered which are thermally, mechanically and structurally stable, and which have high hardness and resist attrition.

The novel catalytic compounds have such thermal stability that their use at high temperatures (800°–100°C) is possible without change of structure or loss of mechanical strength.

At low temperatures (500°–300°C), the catalytic compounds show high hardness and resist attrition, which allows their preferential use in fluidized beds with outstanding results.

The novel catalytic compounds according to the invention have a special structure of the crystals' unit cells which contains a great number of oxygen atoms, thus giving them special properties as catalysts.

On the other hand, the catalytic compounds according to the invention also have the advantage of making it possible to treat much larger flow rates of ammonia, with the same amount of active material, than with conventional platinum gauzes. The flow rates can be about 12 times larger than the usual ones. Moreover, the temperatures of treatment is about 100°C lower than with platinum gauzes.

The novel catalytic compounds make it possible to use very high volume rates, notably with stationary beds, while effecting the oxidation reaction within a very wide range of pressures, with satisfactory yields at high pressures.

The catalytic compounds of the invention are complex catalysts with limited porosities and specific surface areas between 0.02 and 2 $m^2/g$, containing an active material bonded by ceramic-type bonds to the elements of a refractory carrier made of refractory oxides, such as magnesia silica and zirconia.

According to one embodiment of the invention, the active material of the said complex catalysts is a metal of the platinum group, in amounts between 0.1 % and 10 %, preferably between 0.5 % and 4 %.

According to a favorable variation of the invention, the metal of the platinum group is associated with metal oxides or promoters such as the oxides of iron, nickel, cobalt, titanium, vanadium, bismuth and molybdenum.

It has been found that the use as promoters of metal oxides, notably of magnetite $Fe_3O_4$, of vanadium pentoxide $V_2O_5$, of cobalt oxide CoO, of nickel oxide NiO, bismuth oxide and hematite $Fe_2O_3$ gives a special structure of the unit cell which contains a great number of oxygen atoms, and presumably has a favorable catalytic effect on the oxidation reaction.

The catalytic compounds in which the active material, in small amounts, is very intimately combined with the remainder of the carrier, mainly by ceramic type bonds, may contain no platinum or metals of the platinum group. In such compound the active material is made of one or several metal oxides known as promoters bonded by ceramic bonds to the refractory carrier.

According to the invention, such promoters, introduced separately or simultaneously and possibly alloyed to the metal of the platinum group, have the following contents in the compounds:

The content of $Fe_3O_4$ is 0.5 % to 20 %, preferably 2 %.

The content of $Fe_2O_3$ is 9 % to 80 %, preferably 9 to 65 %.

The content of $V_2O_5$ is 0.5 % to 10 %, preferably 0.9 %.

The content of NiO is 4 % to 20 %, preferably 8 %.

The content of CoO is 4 % to 20 %, preferably 12 %.

The content of bismuth oxide is 4 %, to 20 %, preferably about 12 %.

The content of molybdenum oxide is 4 % to 20 %, preferably about 16 %.

The refractory oxides, introduced separately or simultaneously, have the following contents in the compounds:

Magnesia MgO : 10 % to 60 %, preferably 40 % to 50 %.

Silica $SiO_2$ : 0.2 % to 10 %, preferably about 8 %.

Zirconia $ZrO_2$ : 5 % to 50 %, preferably about 30 %.

The complex catalysts with limited porosities according to the invention are prepared by sintering at high temperatures (1300°C or higher), thus forming solid solutions.

Prior to sintering, the components of the catalysts are uniformly mixed, then compressed at pressures in the 1,000–10,000 bar range.

Due to this special method of preparation, the various components of the compound are combined into solid solutions.

The catalytic compounds of the invention are notably suitable for the oxidation of ammonia on stationary beds. The results are especially satisfactory when a mixture of ammonia and air containing 5 % to 14 % ammonia by volume is led, with very high volume rates (between 10,000 and 500,000 Nl/h per liter catalyst), under absolute pressure between 1 and 60 bars, with an initial temperature around 150°C, over a compound such as described above.

According to a variation of the method, the air in the mixture is enriched with oxygen.

The use of the said catalytic compounds in stationary beds makes it possible to use tubes with small diameters instead of the conventional reactors.

The mechanical strength and high hardness of the catalytic compounds make them especially valuable for the catalytic oxidation of ammonia on stationary beds.

The fluidized-bed method is carried out under pressures which can reach 60 bars. The reaction mixture is introduced into a compound according to the invention under the shape of particles with sizes between 60 and 250 $\mu$, at temperatures between 500°C and 800°C, the volume rate on the fluidized bed being 3,500 to 20,000 Nl/h per liter catalyst. The amount of ammonia in the mixture is 5 % to 14 % by volume. The air may be oxygen-enriched.

The following illustrative examples do not limit the scope of the invention.

EXAMPLE I

A catalyst is prepared by intimately mixing the components, compressing the mixture to about 1,000 bars, then sintering at high temperature, between 1300°C and 1400°C, so as to get the following formulation by weight:

Compound A:

| NiO | 8.5% | ZrO$_2$ | 31.7% |
|---|---|---|---|
| MgO | 49.5% | V$_2$O$_5$ | 0.9% |
| SiO$_2$ | 8.6% | Pt | 0.7% |

The specific surface area is 0.30 m²/g.

Catalyst A is charged into a tubular reactor with a heat exchanger allowing control of the temperature of the catalytic bed.

The NH$_3$ + air mixture is preheated to 150°C. At the outlet, the gases are converted to HNO$_3$, and the results are expresssed as converted ammonia.

The results of this test on a stationary bed are shown on Table I hereafter.

No = No test
P = pressure
IT = inlet temperature
HT = halfway temperature
OT = outlet temperature.

The NH$_3$/Pt ratio expresses the kg/h ammonia introduced per kg platinum in the catalyst.

VvH expresses volumetric speed = ratio of flow gaseous mixture NH$_3$ + air
NIH to volume of catalyst is expressed in liter.

The yield is the percent ammonia converted to nitric acid.

As a comparative test, Table II hereafter shows the results obtained under the best practical conditions on platinum gauzes.

TABLE II

| NH$_3$/Pt | % NH$_3$ by volume | P bars | Temperature of gas mixture | | Temperature of platinum gauzes °C | Yield % |
|---|---|---|---|---|---|---|
| | | | Inlet °C | Outlet °C | | |
| 133 | 9.6 | 1 | 130 | 790 | 840 | 96 |

A parallel between test no 7 on Table I and the test on Table II shows that catalytic compound A according to the invention makes it possible to treat, with the same amount of platinum, a flow rate 1,560/133 = 11.7 times higher than with conventional platinum screen gauzes.

On the other hand, the temperature is lower by about 100°C with the catalyst according to the invention than with conventional platinum gauzes.

EXAMPLE 2

A catalyst without platinum or metals of the platinum group is prepared by mixing and shaping the components, then by sintering at 1300°C or higher, so as to obtain the following formulation:

Compound B:

| NiO | 7.9 % |
|---|---|
| V$_2$O$_5$ | 1.0 % |
| MgO | 45.0 % |
| ZrO$_2$ | 29.2 % |
| SiO$_2$ | 8 % |
| Fe$_3$O$_4$ | 7.9 % |

Compound B is tested in the same reactor as in Ex. 1. The results of this stationary bed test are summarized on Table III.

TABLE III

| No. | vol/vol/h | % NH$_3$ by volume | P bars | Temperature of gas mixture | | | Yield % |
|---|---|---|---|---|---|---|---|
| | | | | IT °C | HT °C | OT °C | |
| 1 | 50,000 | 9.6 | 1 | 150 | 800 | 850 | 84 |
| 2 | 100,000 | 9.6 | 1 | 150 | 800 | 850 | 84 |

TABLE I

| No. | VvH | NH$_3$/Pt | % NH$_3$ by volume | P bars | Temperature of gas mixture | | | Yield % |
|---|---|---|---|---|---|---|---|---|
| | | | | | IT °C | HT °C | OT °C | |
| 1 | 100,000 | 780 | 9.6 | 1 | 150 | 820 | 875 | 92 |
| 2 | 150,000 | 1,170 | 9.6 | 1 | 150 | 820 | 875 | 94 |
| 3 | 200,000 | 1,560 | 9.6 | 1 | 150 | 800 | 850 | 96 |
| 4 | 250,000 | 1,950 | 9.6 | 1 | 150 | 800 | 850 | 94 |
| 5 | 400,000 | 3,120 | 9.6 | 1 | 150 | 800 | 850 | 92 |
| 6 | 500,000 | 3,980 | 9.6 | 1 | 150 | 800 | 850 | 88 |
| 7 | 200,000 | 1,560 | 9.6 | 1 | 150 | 700 | 750 | 96 |

TABLE III-Continued

| No. | vol/vol/h | % NH₃ by volume | P bars | Temperature of gas mixture IT °C | HT °C | OT °C | Yield % |
|---|---|---|---|---|---|---|---|
| 3 | 150,000 | 9.6 | 1 | 150 | 800 | 850 | 80 |
| 4 | 200,000 | 9.6 | 1 | 150 | 800 | 850 | 70 |
| 5 | 10,000 | 9.6 | 1 | 150 | 800 | 850 | 94 |

EXAMPLE 3

Catalytic compound C is prepared under the same conditions as in Ex. 1 and Ex. 2.
Compound C:

| | |
|---|---|
| CoO | 12 % |
| V₂O₅ | 1.0 % |
| MgO | 42.1 % |
| ZrO₂ | 29 % |
| SiO₂ | 8 % |
| Fe₃O₄ | 7.9 % |

Compound C is tested in the same way as in Ex. 1.
Table IV hereafter summarizes the conditions and results of the test.

TABLE IV

| No. | VvH | % NH₃ by volume | P bars | Temperature of gas mixture IT °C | HT °C | OT °C | Yield % |
|---|---|---|---|---|---|---|---|
| 1 | 50,000 | 9.6 | 1 | 150 | 750 | 800 | 86 |
| 2 | 100,000 | 9.6 | 1 | 150 | 750 | 800 | 86 |
| 3 | 150,000 | 9.6 | 1 | 150 | 750 | 800 | 84 |
| 4 | 200,000 | 9.6 | 1 | 150 | 750 | 800 | 72 |
| 5 | 10,000 | 9.6 | 1 | 150 | 750 | 800 | 94 |

EXAMPLE 4

This example is given as a comparative test.
The catalyst is prepared differently from Ex. 1.
Alumina is impregnated with a solution of tetrachloroplatinic acid in such a way that after treatment at 900°C, there remains 2 % platinum deposited on the carrier. The specific surface area of the catalyst is 86.5 m²/g ; the average diameter of the pores is 92 A.

Catalyst D of this example is tested under the same conditions as in Ex. 1. The results are shown on Table V hereafter.

TABLE V

| No. | % NH₃ by volume | VvH | P bars | Temperature of gas mixture IT °C | HT °C | OT °C | Yield % |
|---|---|---|---|---|---|---|---|
| 1 | 9.6 | 100,000 | 1 | 150 | 820 | 832 | 34 |
| 2 | 9.6 | 150,000 | 1 | 150 | 835 | 845 | 32 |
| 3 | 9.6 | 200,000 | 1 | 150 | 800 | 821 | 28 |
| 4 | 9.6 | 250,000 | 1 | 150 | 830 | 835 | 24 |
| 5 | 9.6 | 300,000 | 1 | 150 | 910 | 900 | 28 |
| 6 | 9.6 | 300,000 | 1 | 150 | 875 | 865 | 24 |

A parallel with the results of the tests in Ex. 1 shows the comparatively low yields obtained in this test.

The high platinum content of catalyst D (2 % instead of 0.7 % for catalytic compound A) clearly shows that platinum is not the only active element in the catalysis of the oxidation reaction of ammonia.

EXAMPLE 5

Into a fluid-bed reactor is introduced catalytic compound A of Ex. 1, previously screened to the proper particle size to allow fluidization at the flow rate of the NH₃ + air gas mixture. The reactor includes a heat exchanger for evacuating the calories from the reaction.

The results of the test are shown on Table VI hereafter.

TABLE VI

| No. | VvH | % NH₃ by volume | P bars | Temperature of fluidized bed, °C | Yield % |
|---|---|---|---|---|---|
| 1 | 3,500 | 9.6 | 1 | 750 | 71 |
| 2 | 5,000 | 9.6 | 1 | 750 | 73 |
| 3 | 7,450 | 9.6 | 1 | 750 | 82 |
| 4 | 10,000 | 9.6 | 1 | 750 | 92 |
| 5 | 12,000 | 9.6 | 1 | 750 | 95 |
| 6 | 17,000 | 9.6 | 1 | 750 | 96 |
| 7 | 20,000 | 9.6 | 1 | 750 | 96 |

FIG. 1 of the appended drawing shows the yield of ammonia vs. the volume rate (vol/vol/h). The volume rates (abscissae) are in Nl/h, the yields (ordinates) in %.

It should be noticed that the yields reach highly desirable values from volume rates of 10,000 Nl/h upwards.

EXAMPLE 6

Comparative tests on fluidized beds with catalytic compound A according to the invention and with catalyst D of Ex. 4. The tests were conducted in the fluidizing reactor of Ex. 5, the volume rate being 15,000 Nl/h in all tests, the NH₃ volume percentage being 9.6 in every case and the pressure in the reactor 1 bar.

Figure 2:
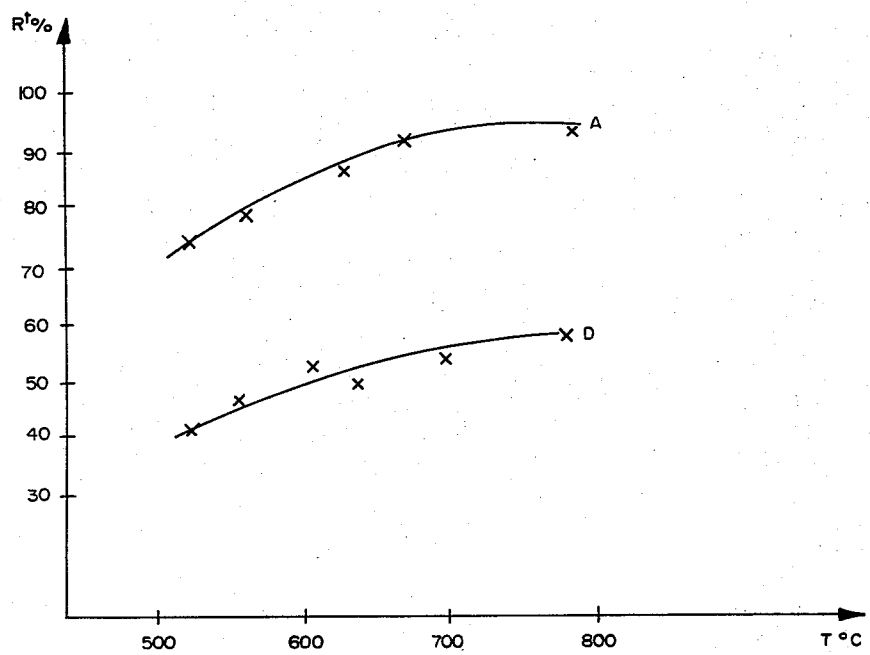

The comparative yield (% NH₃ converted) according to the temperature of the fluidized bed are shown on Table VII hereafter, and on curves A and D of FIG. 2 of the appended drawing; the yields (ordinates) are in % NH₃ and the temperatures (abscissae) in °C.

TABLE VII

| No. | Compound A Temperature of fluidized bed °C | Yield % | Compound D Temperature fluidized bed °C | Yield % |
|---|---|---|---|---|
| 1 | 525 | 475 | 528 | 43 |
| 2 | 565 | 85 | 560 | 48 |
| 3 | 630 | 87 | 610 | 54 |
| 4 | 670 | 93 | 640 | 50 |
| 5 | 780 | 94 | 700 | 55 |

The parallel clearly shows the superiority of compound A according to the invention over a catalyst with high platinum content deposited as a continuous layer on an inert carrier, in the case of a fluidized bed.

EXAMPLE 7

In this example, the behavior of the catalyst in a stationary bed is investigated under various pressures, the yields being expressed as % NH₃ converted.

In the following series of tests, the results of which are shown on Table VIII, the volume % NH₃ is 9.6, the volume rate is 200,000 Nl/h, and the temperature is controlled in the same way, the outlet temperature being 875°C.

TABLE VIII

| Pressure bars | Yield % |
| --- | --- |
| 1 | 96 |
| 10 | 95 |
| 25 | 95 |
| 40 | 88 |

Figure 3:
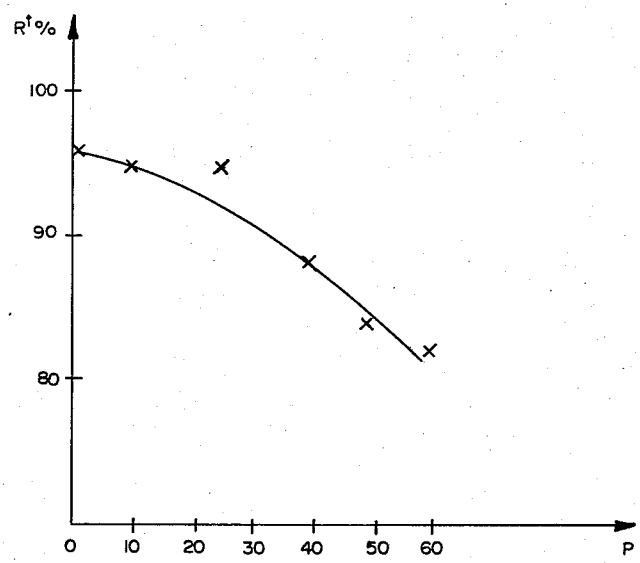

Curve 3 on FIG. 3 of the appended drawing shows the effect of pressure on yield. The pressures (abscissae) are in bars and the yields (ordinates) are expressed as % $NH_3$ converted.

The outstanding behavior of the catalyst should be noted. This type of catalyst is very valuable, as it allows the use of a stationary bed of catalyst along a tube with a small diameter which can withstand high pressures.

EXAMPLE 8

In this example, the tests are made on the fluidized bed of Ex. 5 under various pressures with catalytic compound A.
The conditions are as follows:
% $NH_3$ by volume : 9.6
vol/vol/h = 20,000 Nl/h.
Temperature of fluidized bed : 750°C
The results are summarized on table IX hereafter:

TABLE IX

| Pressure bars | Yield % |
| --- | --- |
| 1 | 96 |
| 20 | 95 |
| 35 | 93 |
| 48 | 91 |
| 60 | 98 |

The outstanding behavior of the catalyst should be noticed. The yields (as % $NH_3$ converted) are quite attractive, even under high pressures.

Figure 4:
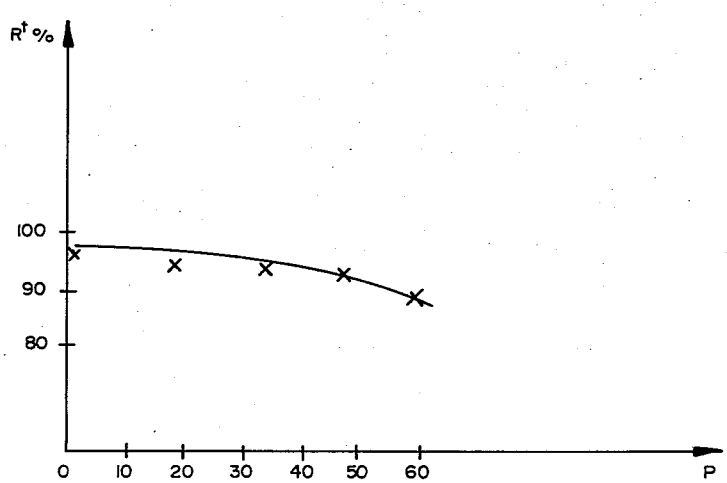

These results are shown on curve 3, FIG. 4 of the appended drawing, on which the yields are the ordinates and the pressures are the abscissae.

EXAMPLE 9

Catalytic compound E is prepared under the same conditions as in Example 1 and Example 2.
Compound E:

| | |
| --- | --- |
| $Bi_2O_3$ | 10 % |
| $V_2O_5$ | 1 % |
| MgO | 42.1 % |
| $ZrO_2$ | 29 % |
| $SiO_2$ | 8 % |
| $Fe_3O_4$ | 9.9 % |

Compound E is tested in the same way as in Example 1.

Table X hereafter summarizes the conditions and results of the test.

TABLE X

| No. | VvH | % $NH_3$ by volume | P bars | Temperature of gas mixture | | | Yield % |
| --- | --- | --- | --- | --- | --- | --- | --- |
| | | | | IT °C | HT °C | OT °C | |
| 1 | 50,000 | 9.6 | 1 | 150 | 750 | 800 | 96 |
| 2 | 100,000 | 9.6 | 1 | 150 | 750 | 800 | 94 |
| 3 | 150,000 | 9.6 | 1 | 150 | 750 | 800 | 94 |
| 4 | 200,000 | 9.6 | 1 | 150 | 750 | 800 | 90 |
| 5 | 10,000 | 9.6 | 1 | 150 | 750 | 800 | 90 |

What we claim is:

1. In a method for the catalytic oxidation of ammonia comprising passing a mixture of ammonia and air over a catalyst under ammonia oxidation conditions, the improvement wherein said catalyst comprises:
a composition, containing no members of the platinum group, with limited porosity, with specific surface area between 0.02 and 2m²/g, wherein said composition consists essentially of metallic oxides consisting of iron oxide, vanadium oxide and at least one further metallic oxide selected from the group consisting of oxides of nickel, cobalt, and bismuth, and a refractory material consisting of magnesia, silica, zirconia or a mixture thereof, all combined by mixing the powdered constituents, compressing at 1,000–10,000 bars and sintering at 1300°C or higher.

2. A method in accordance with claim 1 wherein said conditions comprise a flow rate of ammonia and air between 10,000 and 500,000 Nl/h. per liter catalyst under pressures lying between 1 bar and 60 bars, with an inlet temperature around 150°C.

3. A method in accordance with claim 1 in which the mixture of ammonia and air contains 5 to 14% ammonia by volume.

4. A method in accordance with claim 1 in which the mixture is ammonia and air enriched with oxygen.

5. A method in accordance with claim 1, wherein the contents by weight of said metallic oxides, when present in said composition, are from 0.5 to 20% for $Fe_3O_4$, from 9 to 80% for $Fe_2O_3$, from 4 to 20% for NiO, from 4 to 20% for CoO, from 0.5 to 10% for $V_2O_5$ and from 4 to 20% for bismuth oxide.

6. A method in accordance with claim 1 wherein the contents by weight of said refractory material in said compound are 10–60% MgO, 0.2–10% $SiO_2$ and 5–50% $ZrO_2$.

7. In a method for the catalytic oxidation of ammonia in a fluidized bed comprising introducing a mixture of ammonia and air into a fluidized bed of catalyst under ammonia oxidation conditions, the improvement wherein said catalyst comprises:
a composition, containing no members of the platinum group, with limited porosity, with specific surface area between 0.02 and 2m²/g, wherein said composition consists essentially of metallic oxides consisting of iron oxide, vanadium oxide and at least one further metallic oxide selected from the group consisting of oxides of nickel, cobalt, and bismuth, and a refractory material consisting of magnesia, silica, zirconia or a mixture thereof, all combined by mixing the powdered constituents, compressing at 1,000–10,000 bars and sintering at 1300°C or higher.

8. A method in accordance with claim 7, wherein said conditions comprise a flow rate of ammonia and air between 3,500 and 20,000 Nl/h per liter catalyst, under pressure lying between 1 and 60 bars and at temperatures between 500° and 800°C.

9. A method in accordance with claim 7 in which the mixture of ammonia and air contains 5 to 14% ammonia by volume.

10. A method in accordance with claim 7 in which the mixture is ammonia and air enriched with oxygen.

11. A method in accordance with claim 7 wherein the contents by weight of said metallic oxides, when present in said composition, are from 0.5 to 20% for $Fe_3O_4$, from 9 to 80% for $Fe_2O_3$, from 4 to 20% from NiO, from 4 to 20% for CoO, from 0.5 to 10% for $V_2O_5$, and from 4 to 20% for bismuth oxide.

12. A method in accordance with claim 7 wherein the contents by weight of said refractory material in said compound are 10–60% MgO, 0.2–10% $SiO_2$ and 5–50% $ZrO_2$.

* * * * *